(12) United States Patent
Schneider et al.

(10) Patent No.: US 12,450,179 B2
(45) Date of Patent: Oct. 21, 2025

(54) LZO DECOMPRESSION IN EXTERNAL STORAGE

(71) Applicant: Honeywell International Inc., Charlotte, NC (US)

(72) Inventors: Maximilian Waldo Schneider, Mainz (DE); Francois Vincent, Hessen (DE); Ralf Peter Thor, Baden-Wuerttemberg (DE)

(73) Assignee: Honeywell International Inc., Charlotte, NC (US)

( * ) Notice: Subject to any disclaimer, the term of this patent is extended or adjusted under 35 U.S.C. 154(b) by 707 days.

(21) Appl. No.: 17/456,969

(22) Filed: Nov. 30, 2021

(65) Prior Publication Data
US 2023/0169020 A1    Jun. 1, 2023

(51) Int. Cl.
G06F 13/16 (2006.01)
G06F 13/42 (2006.01)
G06F 21/55 (2013.01)

(52) U.S. Cl.
CPC ...... *G06F 13/1668* (2013.01); *G06F 13/4282* (2013.01); *G06F 21/55* (2013.01); *G06F 2221/034* (2013.01)

(58) Field of Classification Search
CPC .................................................. G06F 13/1668
See application file for complete search history.

(56) References Cited

U.S. PATENT DOCUMENTS

| | | | |
|---|---|---|---|
| 5,255,378 A * | 10/1993 | Crawford | G06F 12/0879 |
| | | | 711/E12.053 |
| 5,359,676 A | 10/1994 | Fan | |
| 5,835,740 A * | 11/1998 | Wise | H04N 19/423 |
| | | | 711/E12.003 |
| 5,890,014 A * | 3/1999 | Long | G06F 13/10 |
| | | | 711/170 |
| 6,081,752 A | 6/2000 | Benson, IV et al. | |
| 6,636,958 B2 | 10/2003 | Abboud et al. | |
| 7,111,142 B2 | 9/2006 | Spencer | |

(Continued)

FOREIGN PATENT DOCUMENTS

| | | |
|---|---|---|
| EP | 2017726 A2 | 1/2009 |
| EP | 2711858 A1 | 3/2014 |

(Continued)

OTHER PUBLICATIONS

Canadian Office Action mailed May 3, 2024; issued in connection with corresponding Canadian Patent Application No. 3,183,509 (5 pages total).

(Continued)

*Primary Examiner* — Ponnoreay Pich
(74) *Attorney, Agent, or Firm* — John Maldjian, Esq.; Stevens & Lee PC (57) ABSTRACT

A method includes inputting a compressed image in a computing device. The method also includes identifying a shortage of random access memory during a decompression process. The method also includes performing calls to a system of memory caches to read and write input and output including the inputted compressed image by a processor. The method also includes identifying arbitrary storage to read and write the input and output by the processor. The method also includes redirecting the input and output by the processor to the identified arbitrary storage.

20 Claims, 5 Drawing Sheets

(56) References Cited

U.S. PATENT DOCUMENTS

| | | |
|---|---|---|
| 7,549,042 B2 | 6/2009 | Glaum et al. |
| 7,657,533 B2 | 2/2010 | Gold |
| 7,734,932 B2* | 6/2010 | Buer .................. G06F 21/51 |
| | | 713/193 |
| 7,747,980 B2 | 6/2010 | Illowsky |
| 7,805,719 B2 | 9/2010 | O'Neil |
| 7,886,093 B1 | 2/2011 | Chen |
| 8,055,096 B2 | 11/2011 | Dahms et al. |
| 8,135,958 B2 | 3/2012 | Greco et al. |
| 8,201,054 B2 | 6/2012 | Slyz et al. |
| 8,341,604 B2 | 12/2012 | Codrescu |
| 8,522,233 B2 | 8/2013 | Nakamura et al. |
| 8,943,492 B2 | 1/2015 | Scian et al. |
| 9,720,616 B2 | 8/2017 | Yu |
| 10,055,353 B2 | 8/2018 | Nachimuthu et al. |
| 10,972,741 B2 | 4/2021 | Simpson |
| 10,983,704 B1* | 4/2021 | Van Gaasbeck ...... G06F 3/0673 |
| 11,175,859 B1* | 11/2021 | La Fratta .............. G06F 3/0659 |
| 2003/0022665 A1 | 1/2003 | Rajaram |
| 2004/0003262 A1* | 1/2004 | England .............. G06F 12/1408 |
| | | 713/189 |
| 2005/0114852 A1* | 5/2005 | Chen ........................ G06F 8/65 |
| | | 714/E11.135 |
| 2005/0144388 A1* | 6/2005 | Newburn ............ G06F 12/0802 |
| | | 711/170 |
| 2005/0240745 A1* | 10/2005 | Iyer ..................... G06F 13/1668 |
| | | 711/E12.079 |
| 2008/0168319 A1* | 7/2008 | Lee ................... H03M 13/3715 |
| | | 714/746 |
| 2009/0070374 A1 | 3/2009 | Eker et al. |
| 2009/0274294 A1 | 11/2009 | Itani |
| 2010/0325523 A1 | 12/2010 | Slyz et al. |
| 2012/0102477 A1 | 4/2012 | Kim |
| 2012/0150877 A1 | 6/2012 | Ramamurthy |
| 2012/0198154 A1 | 8/2012 | Keith, Jr. |
| 2012/0227036 A1 | 9/2012 | Crk |
| 2012/0246392 A1* | 9/2012 | Cheon ................. G06F 12/0873 |
| | | 711/E12.008 |
| 2013/0024545 A1 | 1/2013 | Sheppard |
| 2015/0293701 A1* | 10/2015 | Kim ..................... G06F 3/0652 |
| | | 711/159 |
| 2016/0210251 A1* | 7/2016 | Nale .................... G06F 13/1668 |
| 2016/0378511 A1* | 12/2016 | Jung ....................... G06F 3/067 |
| | | 713/2 |
| 2017/0048303 A1 | 2/2017 | Szilagyi |
| 2017/0090903 A1 | 3/2017 | Bainville |
| 2017/0118675 A1 | 4/2017 | Boch |
| 2017/0194378 A1* | 7/2017 | Kim ....................... H10B 63/30 |
| 2017/0212750 A1 | 7/2017 | Stutzenberger |
| 2017/0337204 A1 | 11/2017 | Szilagyi |
| 2018/0060235 A1 | 3/2018 | Yap et al. |
| 2018/0095668 A1 | 4/2018 | Malyugin et al. |
| 2018/0173723 A1 | 6/2018 | Pfeifle et al. |
| 2019/0146775 A1 | 5/2019 | Wang et al. |
| 2019/0265965 A1 | 8/2019 | Acharya et al. |
| 2019/0324646 A1* | 10/2019 | Homma ................. H04N 23/80 |
| 2020/0118516 A1 | 4/2020 | Kim |
| 2020/0241988 A1 | 7/2020 | Toya |
| 2020/0310782 A1 | 10/2020 | Ujiie et al. |
| 2021/0373881 A1 | 12/2021 | Schneider |
| 2022/0342823 A1* | 10/2022 | D'Eliseo ............ G06F 12/0215 |
| 2023/0168928 A1 | 6/2023 | Schneider |
| 2023/0169020 A1* | 6/2023 | Schneider ............. G06F 21/55 |
| | | 713/189 |
| 2023/0205514 A1 | 6/2023 | Schneider |

FOREIGN PATENT DOCUMENTS

| | | |
|---|---|---|
| EP | 3680773 A1 | 7/2020 |
| JP | 2003-216465 A | 7/2003 |
| KR | 10-1003888 B1 | 12/2010 |
| KR | 10-1541112 B1 | 1/2015 |
| WO | 2010017326 A1 | 2/2010 |
| WO | 2018091085 A1 | 5/2018 |
| WO | 2019042546 A1 | 3/2019 |
| WO | 2019077607 A1 | 4/2019 |
| WO | 2020088913 A1 | 5/2020 |

OTHER PUBLICATIONS

Canadian Office Action mailed May 2, 2024; issued in connection with corresponding Canadian Patent Application No. 3,183,469 (6 pages total).

Moran, Brendan et al. "A Firmware Update Architecture for Internet of Things." Retrieved from: https://tools.ietf.org/id/draft-ietf-suit-architecture-08.html, Retrieved on Jun. 17, 2021 (18 pages total).

Usama M, Zakaria N (2017) Chaos-Based Simultaneous Compression and Encryption for Hadoop. PLoS One 12(1): e0168207. https://doi.org/10.1371/journal.pone.0168207 (18 pages total).

T. Subhamastan Rao et al, / (IJCSIT) International Journal of Computer Science and Information Technologies, vol. 2(5), 2011, 2369-2374 (6 pages total), "Simultaneous Data Compression and Encryption".

Pillai, Vysakh P., "Secure firmware upgrade for embedded systems" (2017) Retrieved from: https://embeddedinn.xyz/articles/tutorial/Secure-Firmware-upgrade-for-embedded-systems/, Retrieved on: Jul. 7, 2021 (7 pages total).

Reddy, Rakesh, "Upgrading Embedded Design Firmware via USB", Published in Embedded.com (http://www.embedded.com) Jun. 2008 (5 pages total).

McDonagh, Colin, "Efficient Wireless Incremental Updates to Resource-Constrained Devices", Dissertation submitted to the University of Dublin, Trinity College, May 2018 (66 pages total).

European Search Report mailed Jun. 1, 2023, issued in connection with corresponding EP Application No. 22214493.3 (8 pages total).

GZIP(1): General Commands Manual, 1993, Jean-loup Gailly (7 pages total).

History of Lossless Data Compression Algorithms, Jan. 2019 (19 pages total), unknown author.

Stolikj, M., Cuijpers, P. J. L., & Lukkien, J. J. (2012). Efficient reprogramming of sensor networks using incremental updates and data compression. (Computer science reports; vol. 1210). Eindhoven: Technische Universiteit Eindhoven (14 pages total).

European Search Report mailed May 15, 2023 issued in connection with corresponding EP Application No. 22211904.2 (12 pages total).

European Search Report mailed Apr. 5, 2023, issued in connection with corresponding EP Application No. 22210343.4 (11 pages total).

European Search Report mailed May 23, 2023 issued in connection with corresponding EP Application No. 22210345.9 (8 pages total).

Kumar Amit Mehta, "Fail-proof Over the Air Firmware Upgrade for Embedded Systems", 2016, Tallinn University of Technology, 2019, (80 pages).

Krishnan et al., "Secure Intermittent Computing Protocol: Protecting State Across Power Loss", IEEE Xplore, 2019, (6 pages).

Korean Office action mailed Sep. 20, 2024, issued in connection with corresponding Korean Patent Application No. 10-2022-0182222 with English language translation (10 pages total).

Canadian Office Action mailed May 15, 2024 issued in connection with corresponding Canadian patent application No. 3,184,605 (4 pages total).

Canadian Office action mailed May 26, 2025, issued in connection with corresponding Canadian Patent Application No. 3,183,469 (4 pages total).

Canadian Office action mailed Jun. 2, 2025, issued in connection with corresponding Canadian Patent Application No. 3,184,605 (4 pages total).

* cited by examiner

LZO DECOMPRESSION IN EXTERNAL STORAGE

TECHNICAL FIELD

The present disclosure generally relates to redirecting input and output to arbitrary storage to enhance LZO compression and performing decryption, decompression, and reencryption in parallel processes.

BACKGROUND

Firmware upgrade on embedded systems can be slow depending on communication speed and image size. Embedded systems also have limited processing and storage resources. Conventional art typically only works on RAM and is not usable as in embedded environments due to limited RAM space.

In embedded systems, when there is a lack of storage space, there can be difficulty in finding storage space for additional input and output. Additional input can include one or more inputted compressed images.

In addition, when firmware images are transferred to an embedded device, it will usually stored temporarily in external storage. Image encryption can be used to secure the image. If the image is compressed, it is necessary to decrypt the entire image before decompression. Moreover, the image then exits even for a short period as plaintext in its compressed or decompressed form.

As such, a need exists to redirect input and output to arbitrary storage when there is a lack of storage space in the computing device or system. Additional storage is needed to redirect the input and output when there is a lack of storage available in the RAM within the computing device or system.

Further, a need also exits to perform decryption, decompression and reencryption in parallel. In addition, a need exits to perform decryption, decompression, and reencryption in parallel without allowing an attacker to read, analyze, or use the image involved.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a method includes inputting a compressed image in a computing device. The method also includes performing calls to a system of memory caches to read and write input and output due to a shortage of memory that includes the inputted compressed image by the processor to facilitate a redirecting of the input and output due to the shortage of the memory during a decompression process. The method also includes redirecting the input and output by the processor to arbitrary storage.

The method also includes redirecting the input and the output to one or more serial devices.

The arbitrary storage includes additional RAM.

In an embodiment, a method includes receiving an inputted compressed image in one or more computing devices. The method also includes attempting to store the inputted compressed image by at least one processor, wherein the at least one processor performs calls to a system of memory caches due to a lack of available storage. Arbitrary storage with at least one of a random access memory (RAM) or Flash memory is selected to redirect additional input and output and the compressed image by the at least one processor. The method also includes sending the compressed image and additional input and output by the processor to the at least one of the RAM or Flash memory.

The method further includes selecting a read-only memory for additional storage.

The method further includes performing decryption and decompression in parallel without storing plaintext in non-volatile storage.

In an embodiment, a system includes a computing device receiving an inputted compressed image. The method also includes a processor that performs calls to a system of memory caches to read and write input and output that includes the inputted compressed image to facilitate a redirecting of the input and output due to a shortage of the memory during a decompression process. The system also includes one or more serial devices including at least one read-only memory or at least one flash memory that receives the redirected input or output.

The arbitrary storage includes an electrically erasable programmable read-only memory (EEPROM).

The processor combines decryption and decompression in parallel processes.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., Mars Inc. v. H.J. Heinz Co., 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a computing system that lacks storage space in its internal random-access memory (RAM) and needs to be able to redirect input and output to arbitrary storage. The arbitrary storage can include nonvolatile storage that is located within the same computing system, or located externally to the computing system.

In anticipation of the need to redirect input and output within the computing system to the arbitrary storage, a microprocessor core will perform calls to a system of memory caches to facilitate the redirecting of the input and output to the arbitrary storage.

The arbitrary storage can include, but is not limited to, additional random-RAM, read-only memory (ROM), electrically erasable programmable read-only memory (EEPROM), flash, and one or more other serial devices. The microprocessor core can redirect the input and output to the nonvolatile or arbitrary storage in response to a lack of available storage within its internal RAM.

Embodiments of the present invention also include perform the process of decryption, decompression, and reencryption in parallel. The processes are perform in parallel to mitigate security risks by firmware images, such as when an attacker tries to read, analyze or otherwise use the image.

In a manufacturer device, a manufacturer key will decrypt a compressed image. The image will then become decompressed and become a plain text box. Once it has become a plain text box, the plain text box can then be reencrypted. As such, the plain text box is reencrypted into a ciphered image. Accordingly, the decryption, decompression, and reencryption occur in parallel to mitigate the security risk presented by firmware images that are stored in plaintext.

System Structure

Figure 1:
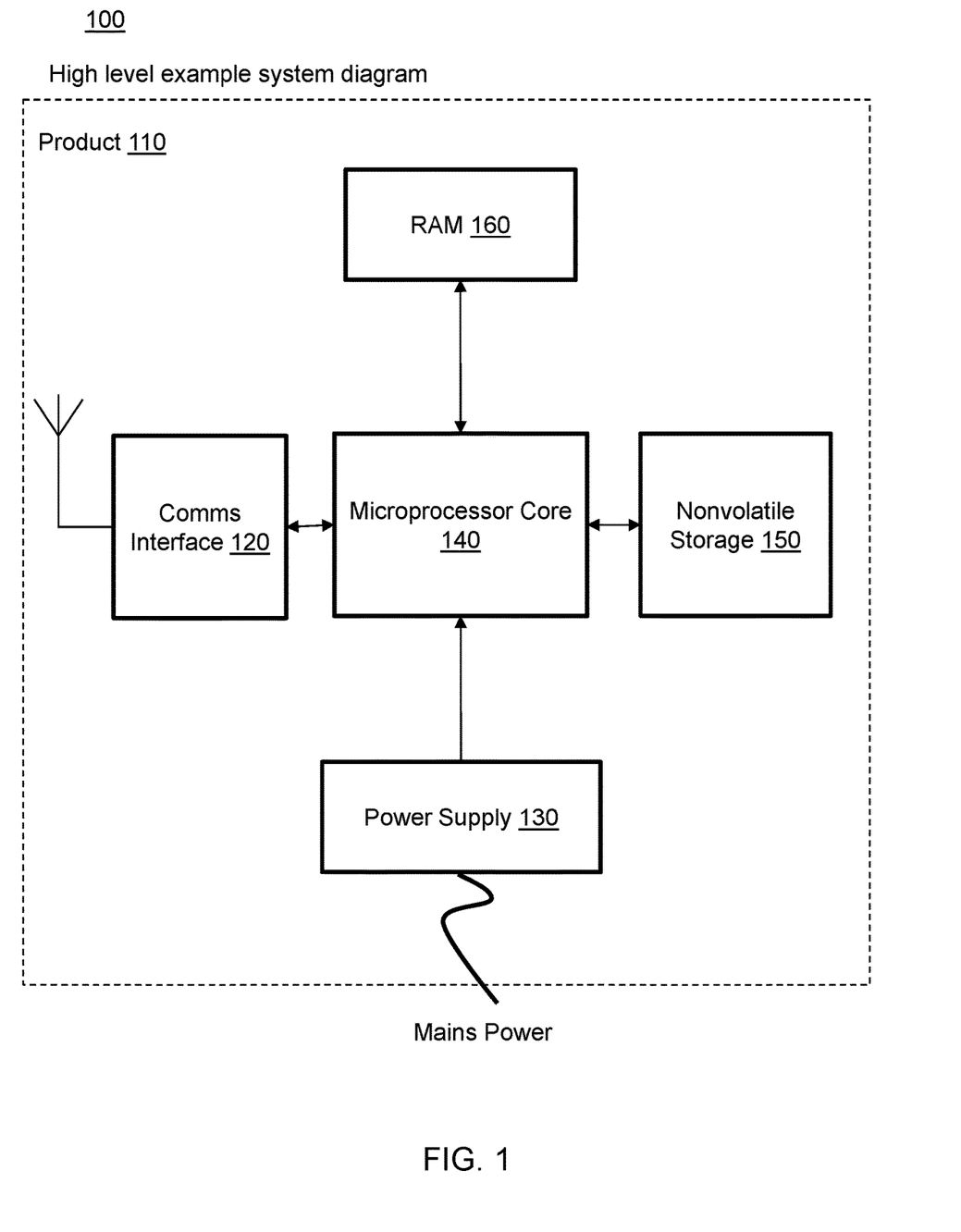
FIG. 1 illustrates a system diagram in accordance with an embodiment of the invention.

FIG. 1 illustrates a high level system (system) 100. The system will include a product 110 that can be input or output. The system 100 also includes a communication (comms) interface 120 that is configured to communicate with a microprocessor core 140. The microprocessor core 140 will be powered by a power supply 130 that provides the main power, and include one or more processors. A nonvolatile storage 150 will be connected to the microprocessor 140. Random access memory (RAM) 160 is also illustrated. The RAM 160 is connected to the microprocessor core 140.

Referring to FIG. 1, the system 100 will receive input such as an inputted compressed image. The microprocessor core 140 will attempt to place any input within the system 100 into either the RAM 160 or the nonvolatile storage 150. The nonvolatile storage 150 can be the arbitrary storage in which output and input can be redirected to if the RAM 160 does not have any available space to store the input and output. The input can also include an inputted compressed image. The microprocessor core 140 will make calls to a system of caches within the nonvolatile storage 150 to facilitate redirecting the input and output to the nonvolatile storage 150 due to the lack of available storage within the RAM 160. The microprocessor 140 will make the calls to the system of caches due to a shortage of memory in the RAM 160, such as during a decompression process. The nonvolatile storage 150 can be within the same computing system as the microprocessor core 140. Alternatively, the nonvolatile storage 150 can be external to the high-level system 100 as well.

In FIG. 1, the microprocessor core 140, based on the calls to the system of caches, can redirect input and output to the nonvolatile storage 150 to store the input and output. The nonvolatile storage can include additional RAM, EEPROM, ROM, Flash, and other serial devices, etc. When there is a lack of available space in the RAM 160 in the high-level system 100, the microprocessor core 140 will make calls to a system of caches including the nonvolatile storage 150 to facilitate the redirection of the input and output. The microprocessor core 140, after making the calls to the system of caches, will then redirect the input and output to the nonvolatile storage 150 to allow the input and output to be stored within the nonvolatile storage 150. As such, the redirecting input and output can be stored in additional RAM, ROM, EEPROM, flash and/or one or more other serial devices.

Figure 2:
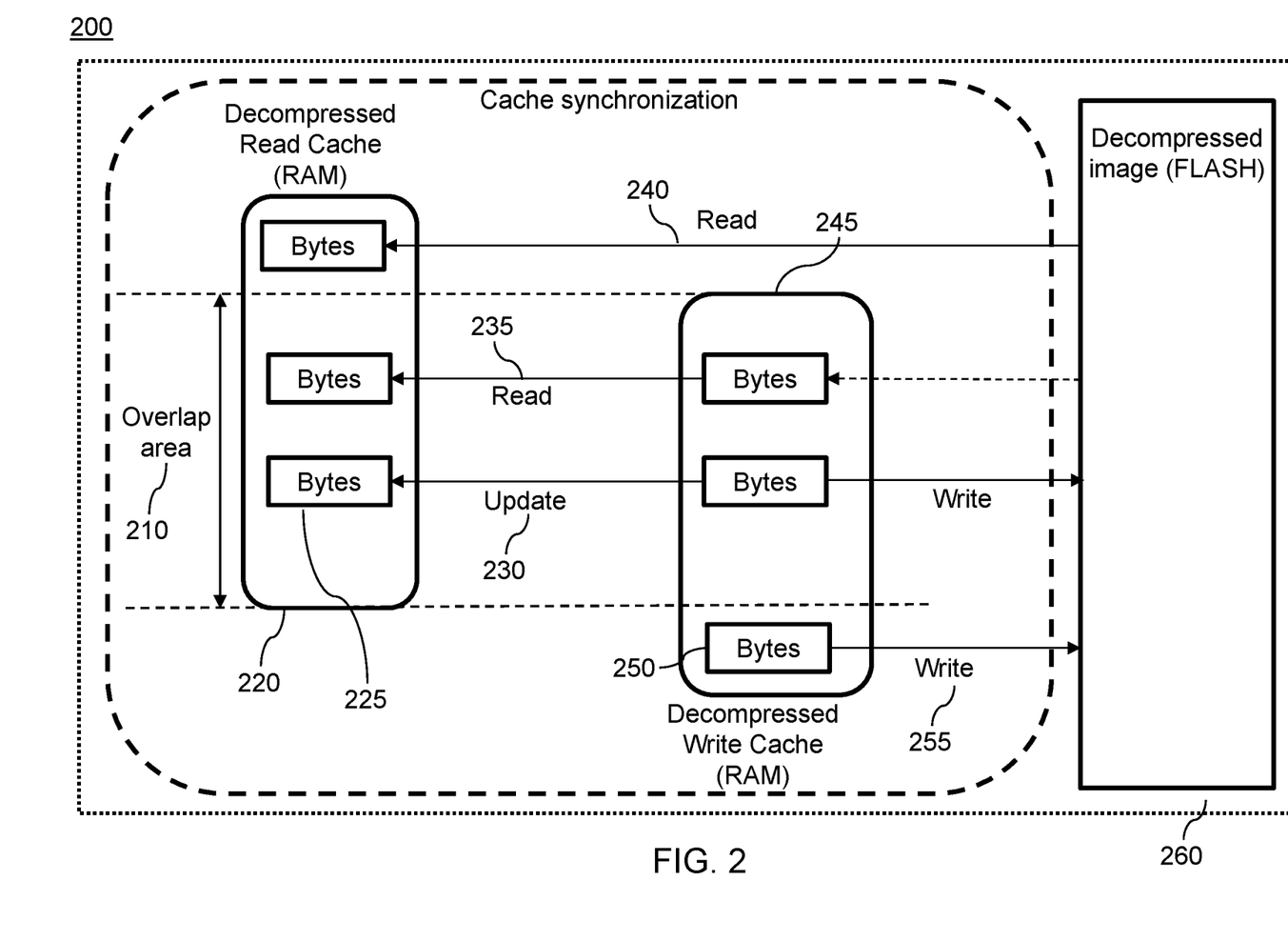
FIG. 2 illustrates schematic diagram in accordance with an embodiment of the invention.

In FIG. 2, a system 200 with internal cache synchronization, wherein synchronization is needed only in case of overlap. A process in which output and input is redirected to arbitrary storage in further detail is shown. The system 200 includes an overlap area 210, a decompressed read cache RAM 220, and a decompressed write cache RAM 245. The decompressed read cache RAM 220 includes a plurality of data bytes 225. The decompressed write cache RAM 245 will include data bytes 250 that are read into the decompressed read cache RAM 220. The overlap area 210 is the area in which the decompressed read cache RAM 220 and the decompressed write cache RAM 245 overlap, and in which data bytes 250 from the decompressed write cache RAM 245 are read 235 and updated 230 into the decompressed read cache (RAM) 220. The overlap area 210 would exist only if an intersection of buffers is not empty.

Referring to FIG. 2, a decompressed image flash 260 is also illustrated. The decompressed write cache RAM 245 will write 255 the data bytes 250 into the decompressed image flash 260 for storage. When storage is not available in the decompressed write cache RAM 245 or the decompressed read cache RAM 220, the decompressed write cache (RAM) 245 will write the data bytes 250 into the decompressed image flash 260 for storage. The microprocessor core will make calls to the system of memory caches that will include the decompressed image flash 260 to facilitate the redirecting of the data bytes 250 due to a lack of available storage in the decompressed read cache (RAM) 220 and the decompressed write cache (RAM) 245. The decompressed image flash 260 will provide the arbitrary storage when the data bytes 225, 250 cannot be stored in either the decompressed read cache RAM 220 or the decompressed write cache (RAM) 245. The decompressed image flash 260 can be within the same system 200 as the decompressed read cache (RAM) 220 and the decompressed write cache (RAM) 245, or external to the decompressed read cache (RAM) 220 and the decompressed write cache (RAM) 245. The decompressed image flash 260 can also read 240 the data bytes 225 from the decompressed read cache RAM 220. Although the decompressed image flash 260 is illustrated, other arbitrary storage can be included such as ROM or EEPROM or additional RAM. One or more serial devices can be connected to the decompressed image flash 260 and other arbitrary storage including additional RAM, ROM, and EEPROM.

In FIG. 2, in summary, data bytes 250 can be redirected into arbitrary storage such as the decompressed image flash 260 when storage is not available in either the decompressed write cache RAM 245 or the decompressed read cache RAM 220. The microprocessor core will include a processor that will perform calls to arbitrary storage including the decompressed image flash 260 to facilitate for the data bytes 250 to be redirected to the decompressed image flash 260 and other arbitrary storage when storage is not available within internal cache synchronization within the decompressed read cache (RAM) 220 or decompressed write cache (RAM) 245. As such, when there is no available storage within the system 200, the microprocessor core within the system 200 will make calls to a system of caches that include the decompressed image flash 260 to facilitate the data bytes 250 to be redirected when there is a lack of shortage. Ultimately, the microprocessor core, using the decompressed write cache (RAM) 245, will write 255 the data bytes 250 to the decompressed image flash 260. The decompressed image flash 260 can be part of the same system 200 as the cache synchronization, or be external to the system 200 that includes the decompressed write cache (RAM) 245. In addition, although not represented in FIG. 2, there is a third cache that is used only for reading data from a compressed image.

Figure 3:
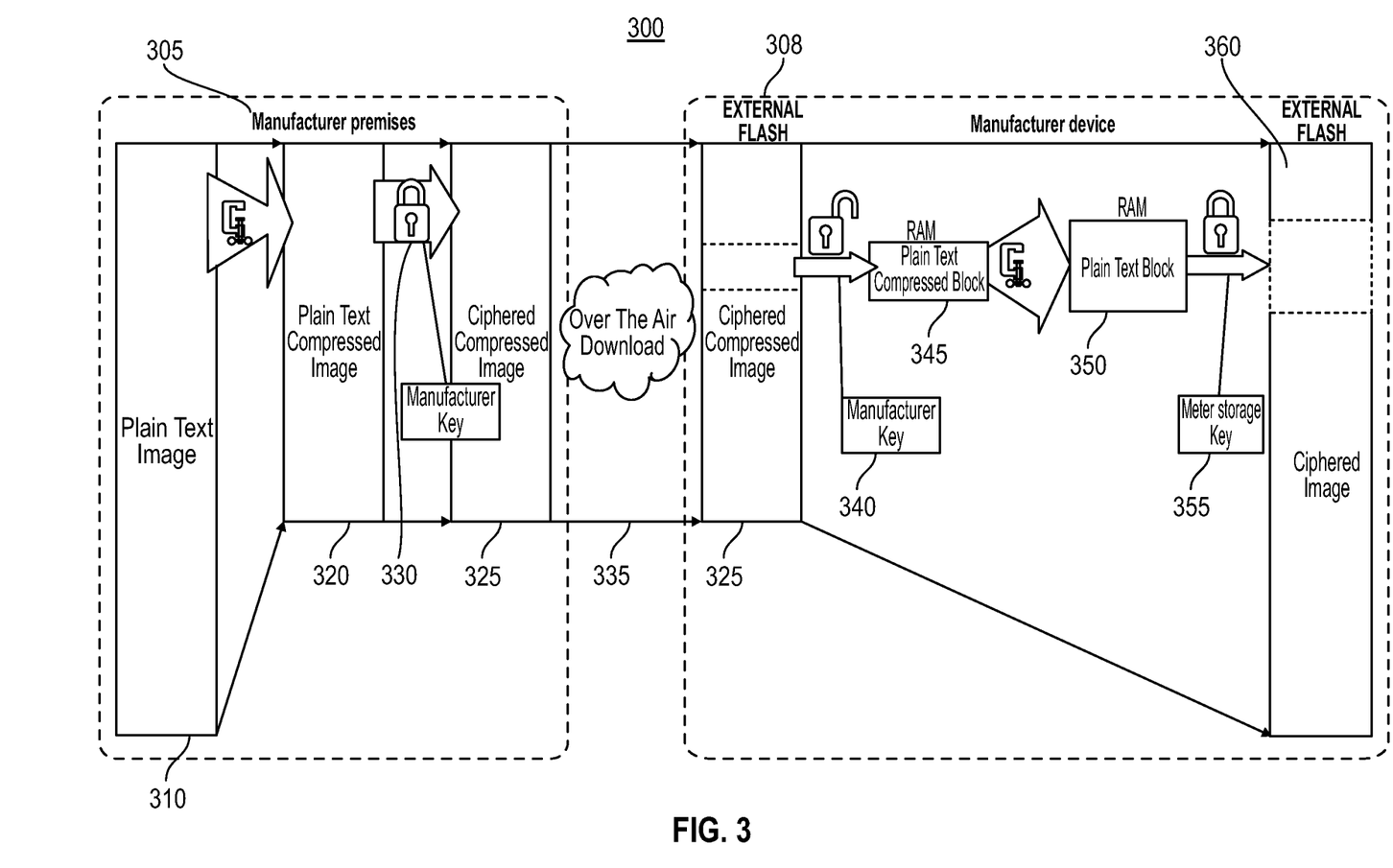
FIG. 3 illustrates a system diagram in accordance with an embodiment of the invention.

In FIG. 3, a system 300 in which decryption, decompression and reencryption occurs in parallel processes. The system 300 includes a manufacturer premises 305 and an external flash 308 as part of a manufacturer device. A plain text image MO is compressed and becomes a plain text compressed image 320. A manufacturer key 330 will encrypt the plain text compressed image 320. The ciphered compressed image 5 will pass over the air download 335 and into the external flash 308 within the manufacturer device.

With respect to FIG. 3, a manufacturer key 340 will decrypt the ciphered compressed image 325 to enable the ciphered compressed image 5 to then be decompressed. When the ciphered compressed image 5 is decrypted, it will become the plain text compressed block 345. The plain text compressed block 345 will then become decompressed and then become the plain text box 350 after decompression. Further, after the plain text compressed block 345 is decompressed, and has become the plain text box 350, the plain text box 350 can thereby be reencrypted. In other words, following the decryption and the decompression, the reencryption process can occur. The manufacturer or another key 355 can reencrypt the plain text box 350. The plain text box 350 can become the ciphered image 6 after being reencrypted.

Referring to FIG. 3, in summary, a plain text image 310 is compressed and becomes a plain text compressed image 320. The plain text compressed image 320 then goes thru a process of becoming encrypted, and then passes onto an external flash 308 to be decrypted, decompressed, and then reencrypted. The process of decryption, decompression, and reencryption all occur in parallel within the manufacture device or external flash 308. Accordingly, within the external flash 308, decryption, decompression, and reencryption can successfully occur in parallel for the ciphered compressed image.

Figure 4:
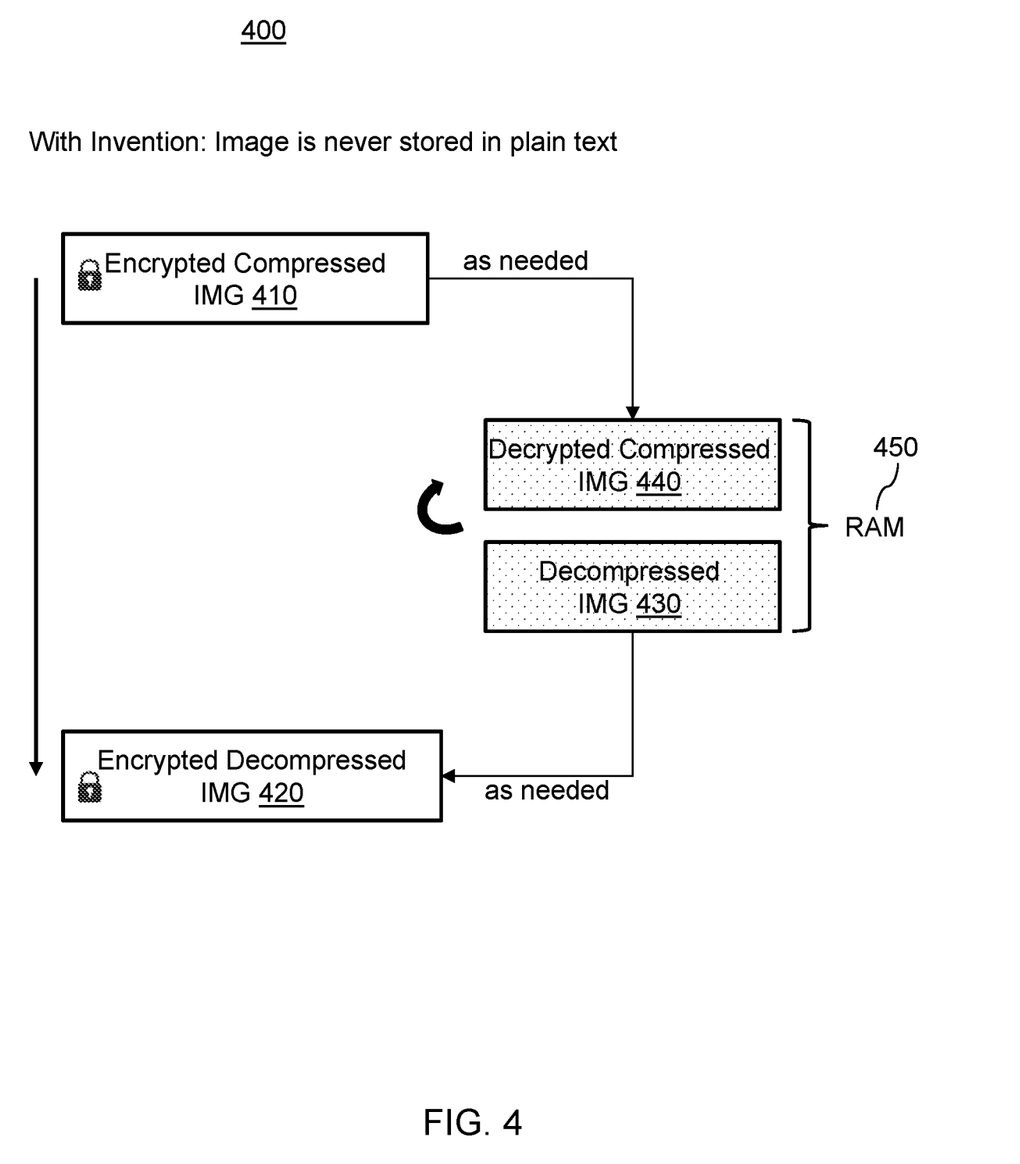
FIG. 4 illustrates a system diagram in accordance with an embodiment of the invention.

In FIG. 4, a system 400 in which the parallel processes of decryption, decompression, and reencryption are illustrated. An inputted compressed image becomes an encrypted compressed image IMG 410. Moreover, a manufacturer key will encrypt the inputted compressed image to put forth the encrypted compressed IMG 410. The encrypted compressed IMG 410 is passed onto a manufacturer device that includes a flash device. The decryption process can begin. The encrypted compressed image IMG 410 can then be decrypted. A manufacturer key within the manufacturer device can decrypt the encrypted compressed image 410. When the inputted compressed IMG 410 is decrypted, it can become a decrypted compressed IMG 440 within the RAM 450. After the image has been decrypted to be the decrypted compressed IMG 440, the decompression process can begin. Moreover, the image can then become decompressed and become the decompressed IMG 430. After decompression, the decompressed IMG can become encrypted again or reencrypted. A manufacturer or another key with the manufacturer device can reencrypt the decompressed IMG 430. When the decompressed IMG 430 is reencrypted, the image can become the encrypted decompressed 420.

Referring to FIG. 4, a parallel process of decryption, decompression and reencryption is illustrated. The inputted and encrypted compressed IMG 410 is passed through the manufacturer device. Further, a manufacturer key can decrypt the encrypted compressed IMG 410 to produce the decrypted compressed IMG 440. After the decryption has occurred, the decrypted compressed IMG 440 can be decompressed. As such, after decompression, the decompressed IMG 430 is produced. After decompression, reencryption can occur. A manufacturer key can reencrypt the decompressed IMG 430. After reencryption, the encrypted decompressed IMG 420 is produced. Overall, the decryption, decompression, and reencryption process all occur in parallel within the manufacturer device.

Figure 5:
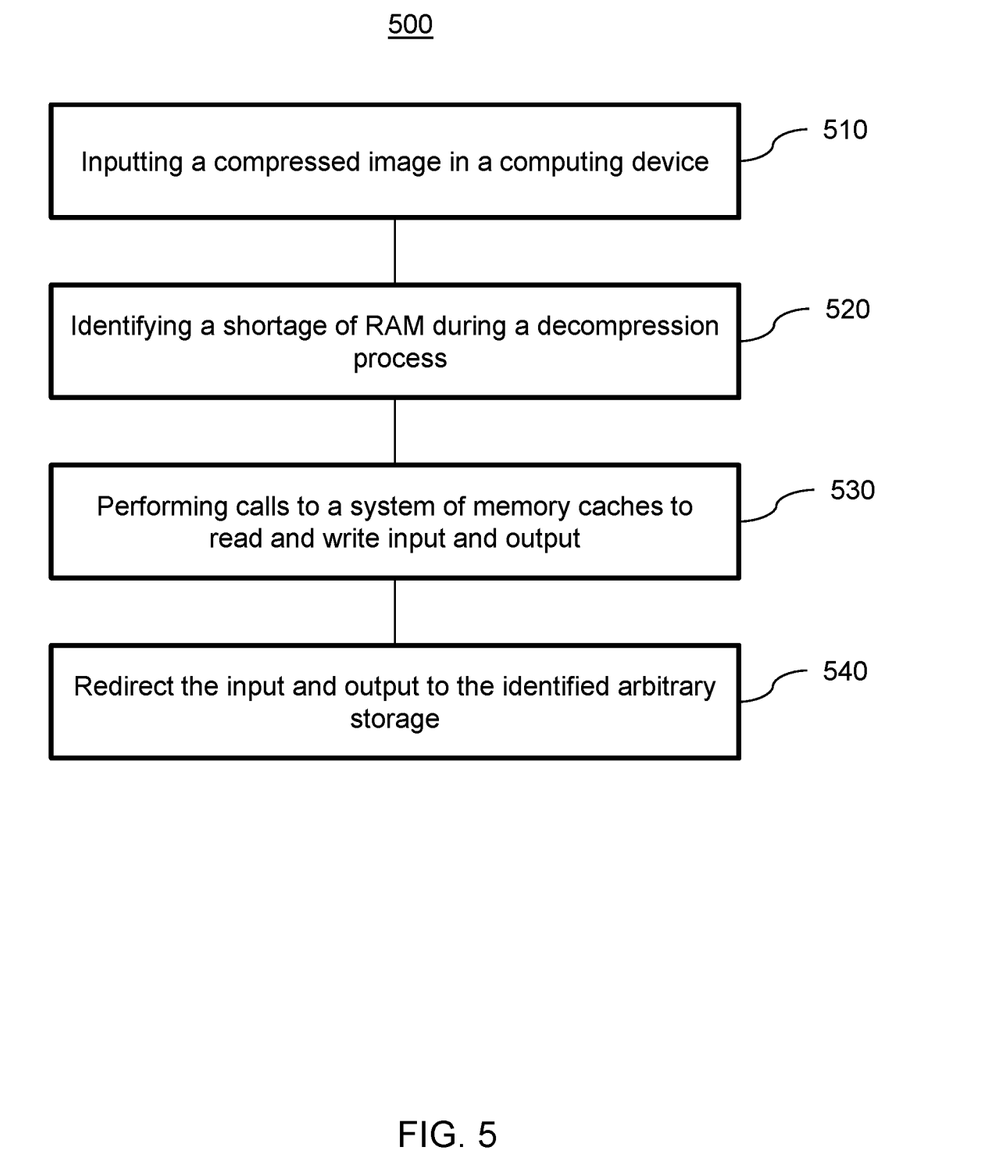
FIG. 5 depicts a flow chart in accordance with an embodiment of the invention.

In FIG. 5, a process 500 of redirecting input and output due to a lack of storage is illustrated. When RAM or other storage within a computing device or system lacks available space, input and output can be redirected to nonvolatile storage. The nonvolatile storage can be external to the computing device or system, or be within the computing device or system.

In FIG. 5, at step 510, at an initial step or state, an inputted compressed image is received into a computing device or system. The process 500 can begin after the inputted compressed image is received.

Referring to FIG. 5, at step 520, a designer, using a microprocessor core, or a processor, can identify if there is a shortage of space within the computing device or system to store input and output including the inputted compressed image.

In FIG. 5, at step 530, the microprocessor core will perform calls to a system of memory caches to read and write the input and output. The microprocessor makes the calls to the system of memory caches to facilitate the redirecting of the input and output due to the lack of available storage space in the RAM within the computing system.

Referring to FIG. 5, at step 540, microprocessor core will redirect the input and output to identified arbitrary storage. The arbitrary storage can be nonvolatile storage that can be within the same computing system as the computing device, or can be external to the computing device. The arbitrary storage can include additional RAM, or ROM, flash, and EEPROM. Moreover, the arbitrary storage can include other serial devices. The input and output is thereby redirected to additional RAM, ROM, EEPROM, or flash for storage.

Those skilled in the art will appreciate that the example embodiments are non-exhaustive and that embodiments other than that described here may be included without departing from the scope and spirit of the presently disclosed embodiments.

Advantages/Summary

Overall, a microprocessor core in a computing system can identify when there is a shortage of storage space within the storage of the computing system. The available RAM within the computing system may not have enough storage space to store input and output.

In anticipation of having to redirect the input and output, the microprocessor core will make calls to a system of memory caches to attempt to redirect the input and output to one or more of the memory caches. Moreover, the system of memory caches can be nonvolatile storage that can be within the computing system, or external to the computing system. The nonvolatile storage can include RAM, ROM EEPROM, Flash, and other serial device. As such, the microprocessor core performs the calls to facilitate the redirecting of the input and output to the nonvolatile storage due to the lack of available storage.

After performing the calls to the system of memory caches to facilitate the redirecting of the input and output to the nonvolatile storage, the microprocessor core redirects the input and output to the nonvolatile storage. The nonvolatile storage can include any one of additional RAM, ROM EEPROM, flash, and other serial devices.

Accordingly, the microprocessor core attempts to facilitate the redirecting of input and output when the microprocessor identifies a shortage of storage space within the computing system. After the calls are made to the system of memory caches, the microprocessor core can redirect any input and output to the nonvolatile storage for storage due to a lack of available storage within the computing system. The nonvolatile storage can be within the same computing system, or can be external to the computing system. The nonvolatile storage can include additional RAM, and also ROM, EEPROM, flash, and other serial devices to store the redirected input and output.

In addition, the decryption, decompression, and reencryption processes can be performed in parallel. An inputted compressed image can be decrypted by a manufacturer key within a manufacturer device. After it is decrypted, the decrypted compressed image can be decompressed into a plain text box. After decompression, the plain text box can be reencrypted into an encrypted decompressed image. Accordingly, the decryption, decompression, and reencryption processes are performed in parallel within the manufacturer device that includes one or more flash devices.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A method comprising:
   inputting a compressed image in a computing device;
   decompressing the inputted compressed image;
   identifying a shortage of storage in one or more of a decompressed read cache random access memory (RAM) and a decompressed write cache RAM of the computing device during the decompression of the inputted compressed image;
   identifying an arbitrary storage by performing calls to a system of memory caches, wherein the arbitrary storage is for reading and writing, by a processor, the inputted compressed image and the decompressed image, and wherein the arbitrary storage includes a decompressed image flash; and
   redirecting the inputted compressed image and the decompressed image, by the processor, to the identified arbitrary storage, wherein, in response to identifying the shortage of storage, the decompressed write cache RAM writes data of the decompressed write cache RAM into the decompressed image flash, and the decompressed image flash reads data from the decompressed read cache RAM.

2. The method of claim 1, wherein the decompressed image overrides the inputted compressed image to complete the decompression process.

3. The method of claim 1, wherein the arbitrary storage includes an additional RAM.

4. The method of claim 1, further comprising:
   adding additional memory caches to speed up decompression speed.

5. The method of claim 1, wherein the inputted compressed image and the decompressed image are redirected to an electrically erasable programmable read-only memory (EEPROM).

6. The method of claim 1, wherein the inputted compressed image and the decompressed image are redirected to serial devices.

7. The method of claim 1, further comprising:
   replacing all direct RAM accesses in response to identifying the shortage of storage.

8. A method comprising:
   receiving an inputted compressed image in one or more computing devices;
   decompressing the inputted compressed image;
   identifying a shortage of storage in one or more of a decompressed read cache random access memory (RAM) and a decompressed write cache RAM of the one or more computing device during the decompression of the inputted compressed image;
   identifying an arbitrary storage by performing calls to a system of memory caches, wherein the arbitrary storage is for reading and writing the inputted compressed image and the decompressed image, and wherein the arbitrary storage comprises one of a decompressed image flash, a random access memory (RAM) or Flash memory; and
   sending the inputted compressed image and the decompressed image to one of the decompressed image flash, the RAM or the Flash memory, wherein, in response to identifying the shortage of storage, the decompressed write cache RAM writes data of the decompressed write cache RAM into the decompressed image flash, and the decompressed image flash reads data from the decompressed read cache RAM.

9. The method of claim 8, further comprising:
identifying an electrically erasable programmable read-only memory (EEPROM) for additional storage.

10. The method of claim 8, further comprising:
performing decryption and the decompression in parallel without storing plaintext in non-volatile storage.

11. The method of claim 8, further comprising:
performing the decompression and reencryption in parallel without storing the inputted compressed image and the decompressed image in the RAM or the flash memory.

12. The method of claim 8, further comprising:
performing decryption and reencryption continuously in parallel without storing plaintext.

13. The method of claim 8, further comprising:
redirecting the inputted compressed image to an electrically erasable programmable read-only memory (EEPROM).

14. The method of claim 8, further comprising:
redirecting the inputted compressed image to at least one of an electrically erasable programmable read-only memory (EEPROM) or a serial device.

15. A system comprising:
a computing device receiving an inputted compressed image;
a processor configured to:
  decompress the inputted compressed image;
  identify a shortage of storage in one or more of a decompressed read cache random access memory (RAM) and a decompressed write cache RAM of the computing device during the decompression of the inputted compressed image;
  identify an arbitrary storage by performing calls to a system of memory caches, wherein the arbitrary storage is for reading and writing the inputted compressed image and the decompressed image, and wherein the arbitrary storage comprises one or more serial devices including at least one of a decompressed image flash, read-only memory, and flash memory; and
  redirect the inputted compressed image and the decompressed image to the one or more serial devices, wherein, in response to identifying the shortage of storage, the decompressed write cache RAM writes data of the decompressed write cache RAM into the decompressed image flash, and the decompressed image flash reads data from the decompressed read cache RAM.

16. The system of claim 15, wherein the arbitrary storage includes at least one additional RAM.

17. The system of claim 15, wherein the arbitrary storage includes an electrically erasable programmable read-only memory (EEPROM).

18. The system of claim 15, wherein the processor combines decryption and decompression in parallel processes.

19. The system of claim 15, wherein plaintext is not stored within the arbitrary storage.

20. The system of claim 15, wherein the processor combines a decryption process and reencryption process in parallel to mitigate one or more security risks.

* * * * *